United States Patent
Timms et al.

[11] 3,756,026
[45] Sept. 4, 1973

[54] PROPULSION FLOW MODULATING SYSTEM

[75] Inventors: Richard H. Timms, San Diego; Leonard Holman, Imperial Beach, both of Calif.

[73] Assignee: Rohr Corporation, Chula Vista, Calif.

[22] Filed: Apr. 23, 1971

[21] Appl. No.: 136,752

[52] U.S. Cl.............. 60/226 R, 60/271, 239/265.43
[51] Int. Cl............................ F02k 1/06, F02k 3/04
[58] Field of Search............... 60/226 R, 271, 39.48; 239/265.43; 137/15.1, 223; 138/45, 93; 244/53 B

[56] References Cited
UNITED STATES PATENTS

| | | | |
|---|---|---|---|
| 3,546,882 | 12/1970 | Berkey | 60/226 R |
| 3,662,556 | 5/1972 | Poucher | 60/226 R |
| 2,737,019 | 3/1956 | Billman | 239/265.43 |
| 3,279,192 | 10/1966 | Hull | 60/271 |
| 3,285,003 | 11/1966 | Martin | 244/53 B |
| 3,303,653 | 2/1967 | Hull | 60/226 A |
| 3,494,380 | 2/1970 | Martin | 137/15.1 |

*Primary Examiner*—Douglas Hart
*Attorney*—George E. Pearson

[57] ABSTRACT

Front fan jet engine has core cowl surrounding engine and terminating in jet exhaust nozzle. Elongate streamlined shroud surrounds fan and engine to define annular duct for rearward flow of fan air and terminates forward of trailing edge of cowl in a transverse plane to form nozzle exit. An expandible band of elastomeric material extends around substantially the entire periphery of the cowl at the nozzle exit plane and fore and aft of the plane, the margins being sealed to the cowl wall. The intermediate peripheral portion of the band is expanded radially toward the wall of the shroud to decrease the flow area and modulate the flow when required by the flight regime. In preferred form, the cowl wall under the band is perforated and a plenum chamber under the perforated area supplies pressure fluid to extend the band. Pressure fluid may be from any source, such as engine bleed air, and is supplied to penum chamber by suitable conduit.

1 Claim, 6 Drawing Figures

PATENTED SEP 4 1973 3,756,026

INVENTOR.
RICHARD H. TIMMS
LEONARD HOLMAN

BY George E. Pearson
ATTORNEY

INVENTOR.
RICHARD H. TIMMS
LEONARD HOLMAN 3,756,026

PROPULSION FLOW MODULATING SYSTEM

BACKGROUND OF THE INVENTION

This invention lies in the field of gas turbine engines, commonly called jet engines, which produce reaction thrust by ejecting a high velocity stream of gas from the exhaust nozzle of the gas turbine. A modified form of such engine, commonly referred to as a fan jet, incorporates a nacelle or shroud surrounding and spaced from the engine and its cowl to form a passage for the rearward flow of air from the radially outer portion of the compressor or fan which also supplies combustion air to the turbine. In this type, the major portion of the total thrust is provided by the air stream delivered by the fan to the passage or duct. The invention is directed to this type of engine and particularly to means for modulating the air flow to obtain optimum thrust and efficiency.

It is well known that the total thrust and the thrust efficiency of any given jet engine installation depend upon very careful design of the thrust nozzle, and that the configuration or profile of the nozzle must vary for different flight regimes. So-called variable area nozzles have been used for this purpose for years and have taken many different forms. Conventional jet engines have used center bodies aft of the turbine and axially movable within the nozzle or radially expansible and contractible, or nozzle walls which are expansible and contractible at their trailing edges, or combinations of these. Fan type engines have also used variations of the above which were suitable for their construction. Most of these have achieved the desired result but have suffered the disadvantage of a multiplicity of mechanical parts which must work reliably at all times but which are subject to wear and damage, resulting in high first cost and maintenance expense.

SUMMARY OF THE INVENTION

The present invention provides a system which is particularly applicable to fan jet engines although its principles may be applied to other types with appropriate modifications. It accomplishes the function of varying the flow area of the fan air duct with a construction which involves a minimum number of moving parts, is very light and simple, and needs very little maintenance.

Generally stated, it is necessary to add only two major components to a conventional fan jet installation. The latter normally includes a jet engine enclosed in a core cowl with a compressor or fan mounted at the forward end of the engine shaft, the fan being of sufficient size to supply air to the turbine for combustion and a rearward flow of air around the cowl to produce a major part of the total thrust. The engine and fan are surrounded by a shroud radially spaced from the cowl to define a passage or duct for the rearward flow of propulsion air delivered by the fan. The shroud terminates forward of the trailing edge of the cowl in a transverse plane defining an exit nozzle.

In the presently preferred form of the invention, a band of elastomeric material is mounted on the cowl wall to extend substantially around the periphery and is of sufficient size axially to extend forward and aft of the nozzle exit plane, preferably equidistantly. The band is constructed to have a limited amount of stretch and, in contracted position lies in engagement with the cowl wall with its margins secured thereto. In operation, the intermediate peripheral portion of the band is forced radially toward the wall of the shroud in the vicinity of the exit plane, thus reducing the flow area of the nozzle. While the band may be extended by various mechanical means, in its preferred form the extension is produced by fluid pressure.

For this purpose, the area of the cowl wall underlying the band is perforated and a peripheral plenum chamber underlies the perforated area within the cowl. Both the band and the plenum chamber are sealed to the cowl wall, and a suitable conduit supplies pressure fluid such as engine bleed air to the planum chamber when required. Thus the only major components required to be added to a standard installation are the band and the plenum chamber. The maintenance requirements of these components are negligible.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENT

Figure 1:
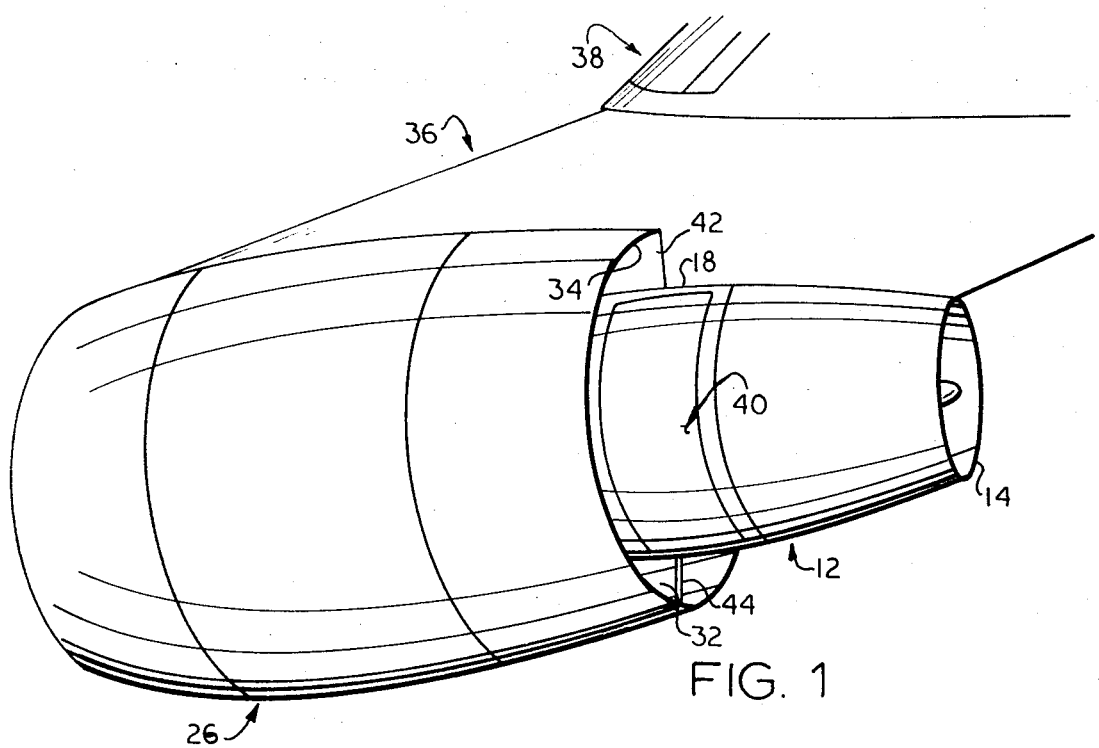
FIG. 1 is a schematic perspective view of a wing-mounted engine installation incorporating the invention.
Figure 2:
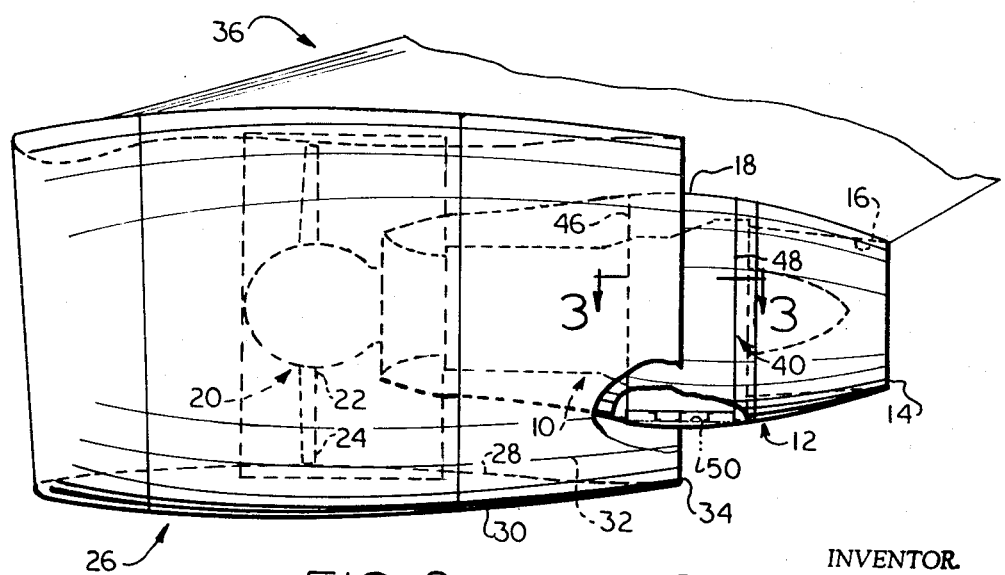
FIG. 2 is a schematic elevational view of the installation of FIG. 1.

The system of this invention is schematically illustrated in FIGS. 1 and 2, in which the engine 10 is encased within a core cowl 12 which terminates rearwardly at the exit 14 of the exhaust gas nozzle or tail pipe 16, the greatest diameter of the cowl being at an intermediate locus 18. At its forward end, the engine is provided with an axial flow compressor or fan 20, the radially inner portion 22 of which directs combustion air into engine 10 and the radially outer portion 24 of which drives a jet or fan air stream rearward outside of the cowl to directly produce jet thrust. Surrounding the fan and engine is an elongate streamlined generally annular shroud 26 having radially spaced inner and outer walls 28 and 30. The inner wall 28 is radially spaced from the wall of cowl 12 to form an annular duct 32 for rearward flow of the fan air stream. Walls 28 and 30 converge rearwardly to form a thin trailing edge 34 defining an air jet nozzle exit in a transverse plane substantially at locus 18. A pylon 36 is attached at its lower end to the engine and shroud and at its upper end to a supporting wing 38.

The means for varying the flow area of duct 32 is shown in FIGS. 1 and 2 as a band 40 of elastomeric material extending substantially completely around the periphery of cowl 12 at locus 18. As indicated in FIG. 1, if partitions 42 and 44 extend radially between the cowl and the shroud, the band is divided into two segments extending as far as possible between the partitions to constitute a practically complete ring. The band has generally parallel fore and aft margins 46 and 48 by means of which it is secured to the wall of the cowl and these margins are a substantial distance fore and aft of trailing edge or nozzle exit 34 and preferably are equidistant from it.

As mentioned previously, the band 40 is formed of elastomeric material so that it may be stretched by an internal force. The band contains reinforcing elements which limit the stretching to a predetermined extent as will be explained later. In the broken away portion of FIG. 2, it will be seen that the section 50 of the core wall underlying the band is substantially cylindrical. When the band is contracted it lies in engagement with section 50 and is also substantially cylindrical. When it is in such condition or position the flow area at the nozzle exit 34 is at its design maximum to give optimum flow conditions for takeoff and climb. When the band is extended to the position shown in FIG. 2, the flow area is at its design minimum to give optimum flow conditions for cruising flight. The proper maximum and minimum flow areas are determined during the design stage. It will be seen that when the band is extended it provides a smooth curved contour which complements the contours of the forward and aft portions of the cowl. In some design cases section 50 may have some degree of convex curvature and the extended band will have a greater curvature. It will also be noted that the area of duct 32 decreases rearwardly to define a convergent nozzle and that extension of band 40 increases the convergence in the final portion.

Figure 3:
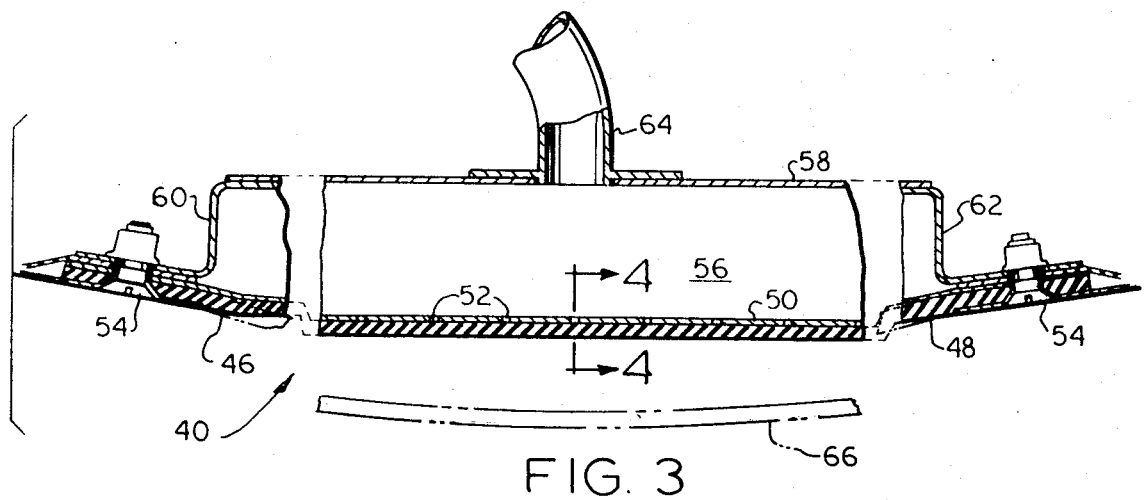
FIG. 3 is a sectional view taken on line 3—3 of FIG. 2.

The zone of the cowl which includes the area-varying band 40 is illustrated in greater detail in FIG. 3. Here it will be seen that section 50 takes the form of a plate provided with a plurality of perforations 52 to permit air flow through the plate. The axially intermediate portion is substantially cylindrical and its fore and aft margins are secured to the wall structure of the balance of cowl 12. Band 40 overlies section 50 and in its contracted condition is in engagement therewith and takes the same substantially cylindrical form. Both of these components are secured to the cowl by a plurality of fasteners 54 and are sealed by any suitable means to make the joints air tight.

A peripheral plenum chamber 56 is located within the cowl and underlying section 50, and includes a main cylindrical plate 58 and fore and aft margins 60 and 62 which are secured to the cowl by fasteners 54 and sealed by any suitable means. Pressure fluid, such as engine bleed air, is supplied to the plenum chamber through conduit 64 and controlled by suitable valving means, not shown. During takeoff and climb, pressure is released from the plenum chamber so that the band 40 will lie in engagement with section 50 as shown in solid lines to provide maximum flow area at the nozzle exit. When the airplane reaches cruising altitude, pressure fluid is supplied to the plenum chamber through conduit 64 and flows through perforations 52 to force band 40 outward away from section 50 and toward the shroud. The band stretches uniformly so that the intermediate peripheral portion 66 has the greatest radial extension, and this occurs substantially at the plane of the nozzle exit. The stretching is limited to a predetermined extent so that the reduced flow area will be in accordance with design requirements.

Figure 4:
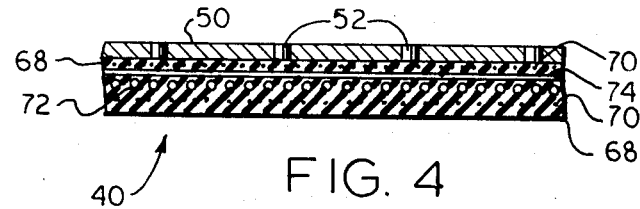
FIG. 4 is a partial sectional view taken on line 4—4 of FIG. 3.
Figure 5:
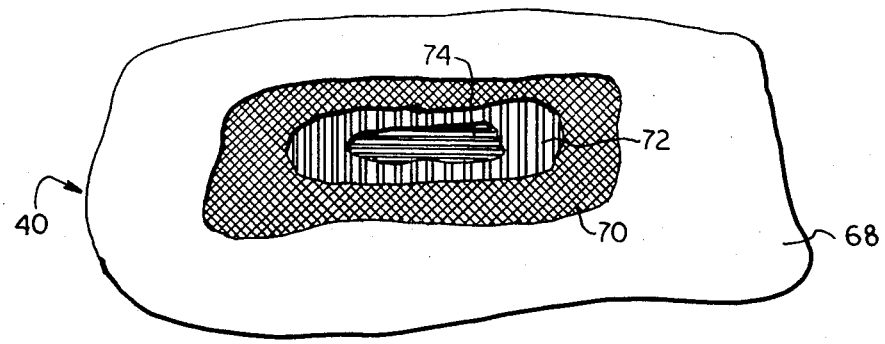
FIG. 5 is a partial plan view of the band with parts broken away to show the interior construction.
Figure 3A:
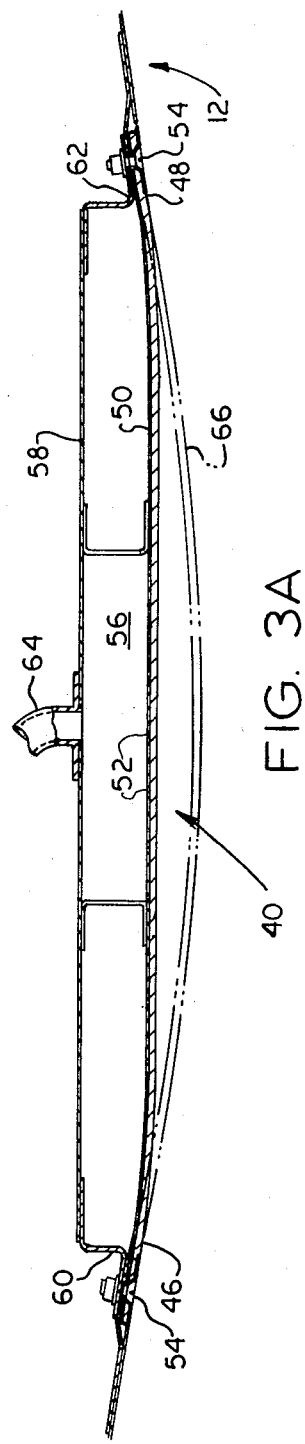
FIG. 3a is an unbroken line showing of the FIG. 3 showing.

The construction of band 40 is shown in FIGS. 4 and 5. It is a laminate having outer layers 68 of a relatively high stretch elastomer and a core including a bias weave fabric ply 70 underlying each layer 68 and central reinforcement members comprising lateral stiffening cords 72 and longitudinal stiffening cords 74. The cords may be of any suitable material such as high stretch low stretch nylon filaments having a basic elastic yield of only a few percent. The cords are selected so that the fluid pressure available is not sufficient to stretch them beyond their basic yield, and therefore they serve to limit the stretch of the entire laminate to the desired degree.

It will be apparent that the present invention provides a system for modulating propulsion flow in accordance with predetermined design factors in an extremely simple fashion. The only two major components which must be added to a standard engine cowl are the plenum chamber and the expansion band. The former should require no maintenance whatsoever and the latter is subject to minimal wear and damage. It has the added advantage of minimal weight and complexity.

Having thus described the invention, what is claimed as new and useful and is desired to be protected by U. S. Letters Patent is:

1. An aircraft propulsion flow modulating system comprising: a jet engine having a fan driven by the engine to produce a propulsion air stream; a core cowl surrounding the engine; a streamlined shroud surrounding the engine and fan having an inner wall radially spaced from the cowl wall to define therewith a generally annular duct for rearward flow of the propulstion air stream delivered by the fan; the shroud terminating forward of the trailing edge of the cowl in a plane transverse to the axis of the engine and defining with the cowl a rearwardly discharging nozzle exit; and means for varying the flow area of the duct in the vicinity of the nozzle exit comprising an elongate band of elastomeric material extending substantially around the periphery of the cowl wall; the band having generally parallel fore and aft margins located forward and aft of the plane of the nozzle exit and being air-tightly secured to the cowl wall; in which the band comprises an elongate; laminated flexible strip having one or more outer layers of a high-stretch elastomer and a reinforcing core including multiple substantially straight strands of a low-stretch material serving to limit the extensibility of the band to a predetermined degree corresponding to the limit of stretch of the strands; the band in contracted position lying against the cowl wall; a plenum chamber underlying the cowl wall and substantially coextensive axially and peripherally with the band and air-tightly secured to the interior of the cowl wall; the latter being perforated in the coextensive area to allow passage of pressure fluid between the plenum chamber and the band; and a conduit communicating at one end with the plenum chamber and at the opposite end with a source of pressure fluid to introduce the fluid into the plenum chamber and under the band to force its intermediate peripheral portion toward the shroud wall and reduce the flow area of the duct.

* * * * *